US012542408B2

(12) United States Patent
Rengifo et al.

(10) Patent No.: US 12,542,408 B2
(45) Date of Patent: Feb. 3, 2026

(54) CIRCULAR PLUG CONNECTOR WITH ANTI-ROTATION MECHANISM

(71) Applicant: TE Connectivity Solutions GmbH, Schaffhausen (CH)

(72) Inventors: Alex Robert Rengifo, Oceanside, CA (US); Mikayla J. Garvin, Morrisville, NC (US); James Friedhof, Carlsbad, CA (US)

(73) Assignee: TE Connectivity Solutions GmbH (CH)

( * ) Notice: Subject to any disclaimer, the term of this patent is extended or adjusted under 35 U.S.C. 154(b) by 539 days.

(21) Appl. No.: 18/065,650

(22) Filed: Dec. 14, 2022

(65) Prior Publication Data

US 2024/0204467 A1 Jun. 20, 2024

(51) Int. Cl.

| | |
|---|---|
| ***H01R 24/86*** | (2011.01) |
| ***H01R 13/623*** | (2006.01) |
| ***H01R 13/629*** | (2006.01) |
| ***H01R 13/639*** | (2006.01) |

(52) U.S. Cl.
CPC ........... *H01R 24/86* (2013.01); *H01R 13/623* (2013.01); *H01R 13/629* (2013.01); *H01R 13/62927* (2013.01); *H01R 13/639* (2013.01)

(58) Field of Classification Search
CPC .... H01R 24/86; H01R 13/623; H01R 13/629; H01R 13/62927; H01R 13/639; H01R 13/6276; H01R 13/432; H01R 13/533; H01R 13/622
See application file for complete search history.

(56) References Cited

U.S. PATENT DOCUMENTS

| | | | | |
|---|---|---|---|---|
| 3,552,777 A * | 1/1971 | Heinrich et al. | H01R 13/622 | 439/321 |
| 4,508,407 A * | 4/1985 | Ball | H01R 13/622 | 439/348 |
| 9,099,807 B2 * | 8/2015 | Opgenorth | H01R 13/62 | |
| 9,236,688 B2 | 1/2016 | Friedhof | | |
| 10,218,122 B1 | 2/2019 | Rengifo | | |
| 2016/0072221 A1 * | 3/2016 | Bates, III | H01R 43/0207 | 439/352 |

FOREIGN PATENT DOCUMENTS

| | | | |
|---|---|---|---|
| GB | 2092392 A * | 8/1982 | H01R 13/622 |
| GB | 2481534 A * | 12/2011 | H01R 13/639 |

* cited by examiner

*Primary Examiner* — Travis S Chambers

(57) ABSTRACT

A circular plug connector includes a plug shell having a cavity, a plug insert received in the cavity, and plug contacts held in the plug insert. The circular plug connector includes an outer coupling ring rotatable about the plug shell and having threads configured to be threadably coupled to a mating connector. The circular plug connector includes an anti-rotation mechanism between the plug shell and the outer coupling ring to resist rotation of the outer coupling ring relative to the plug shell. The anti-rotation mechanism includes a locking ball, a biasing member interfacing with the locking ball, and a clicker disk. The clicker disk includes a ring plate surrounding the plug shell and an array of dimples circumferentially spaced apart along the ring plate.

20 Claims, 4 Drawing Sheets

CIRCULAR PLUG CONNECTOR WITH ANTI-ROTATION MECHANISM

BACKGROUND OF THE INVENTION

The subject matter herein relates generally to electrical connectors.

Some known electrical connectors provide an interface for high speed data transmission cables. The cables typically include shielded parallel pair cables or various types of coax cables terminated contacts arranged within the electrical connector. Some known electrical connectors are manufactured according to military specifications. For example, in electronic enclosures, panel connectors are used to interconnect the signals originating inside an enclosure and to other avionic boxes. MIL-DTL-38999 connectors are popular connectors used widely in the military and aerospace avionics applications. However, the electrical connectors are used in harsh environments and subject to vibration. Some known electrical connectors utilize an anti-rotation mechanism to maintain mating compliance and resist loosening of the coupling nut. The anti-rotation feature is typically in the form of a ring having teeth that receive a locking ball. The teeth are ramped and capture the ball in the channel defined between two of the teeth. However, such teeth are subject to wear over time. Additionally, the spacing between the teeth may be relatively large, leading to large angular rotations between the teeth.

A need remains for an improved anti-rotation mechanism for circular connectors.

BRIEF DESCRIPTION OF THE INVENTION

In one embodiment, a circular plug connector is provided and includes a plug shell having a mating end configured to be mated with a mating connector. The plug shell has a cavity holding a plug insert. The circular plug connector includes plug contacts held in the plug insert. The plug contacts have mating ends configured to be mated with mating contacts of the mating connector. The circular plug connector includes an outer coupling ring rotatable about the plug shell. The outer coupling ring includes threads configured to be threadably coupled to the mating connector. The circular plug connector includes an anti-rotation mechanism between the plug shell and the outer coupling ring to resist rotation of the outer coupling ring relative to the plug shell. The anti-rotation mechanism includes a locking ball, a biasing member interfacing with the locking ball, and a clicker disk. The clicker disk includes a ring plate surrounding the plug shell and an array of dimples circumferentially spaced apart along the ring plate.

In another embodiment, a circular plug connector is provided and includes a plug shell having a mating end configured to be mated with a mating connector. The plug shell has a cavity holding a plug insert. The circular plug connector includes plug contacts held in the plug insert. The plug contacts have mating ends configured to be mated with mating contacts of the mating connector. The circular plug connector includes an outer coupling ring rotatable about the plug shell. The outer coupling ring includes threads configured to be threadably coupled to the mating connector. The circular plug connector includes an anti-rotation mechanism between the plug shell and the outer coupling ring to resist rotation of the outer coupling ring relative to the plug shell. The anti-rotation mechanism includes a locking ball, a biasing member interfacing with the locking ball, and a clicker disk. The clicker disk includes a ring plate surrounding the plug shell and an array of dimples circumferentially spaced apart along the ring plate. The dimples being oval shaped defining a first track for the locking ball at a first side of each dimple and a second track for the locking ball at a second side of each dimple.

In a further embodiment, connector system is provided and includes a circular plug connector and a circular mating connector coupled together. The connector system includes a circular mating connector including an outer housing having a mating end and an inner housing received in a cavity of the outer housing. The inner housing holding mating contacts. The outer housing has external threads. The circular plug connector includes a plug shell has a mating end received in the cavity of the outer housing. The plug shell has a cavity holding a plug insert. The circular plug connector includes plug contacts held in the plug insert. The plug contacts have mating ends mated with the mating contacts of the circular mating connector. The circular plug connector includes an outer coupling ring rotatable about the plug shell. The outer coupling ring includes threads configured to be threadably coupled to the external threads of the outer housing to secure the circular plug connector to the circular mating connector. The circular plug connector includes an anti-rotation mechanism between the plug shell and the outer coupling ring to resist rotation of the outer coupling ring relative to the plug shell. The anti-rotation mechanism includes a locking ball, a biasing member interfacing with the locking ball, and a clicker disk. The clicker disk includes a ring plate surrounding the plug shell and an array of dimples circumferentially spaced apart along the ring plate.

DETAILED DESCRIPTION OF THE INVENTION

Figure 1:
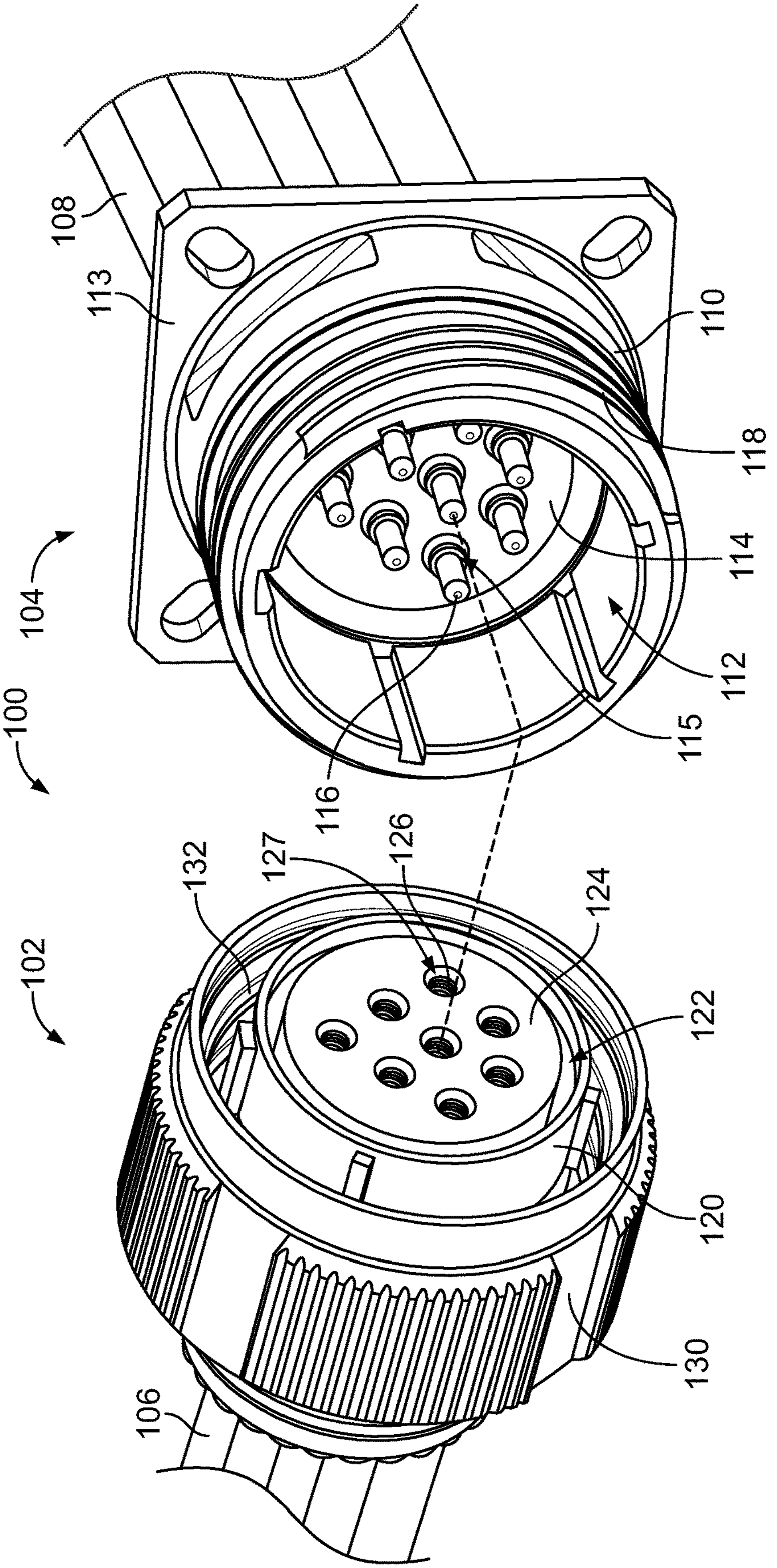
FIG. 1 illustrates a connector system formed in accordance with an exemplary embodiment.

FIG. 1 illustrates a connector system 100 formed in accordance with an exemplary embodiment. The connector system 100 includes a circular plug connector 102 and a circular mating connector 104 configured to be mated together. The connector system 100 is used to connect two data communication cables (not shown) together or to connect a data communication cable to a circuit board (not shown). For example, the data communication cable(s) may be Ethernet cables transmitting data across a computer network. The data communication cable(s) may be fiber optic cables. The circular plug connector 102 is configured to be terminated to the end of the corresponding data communication cable or mounted to a circuit board. The circular mating connector 104 is configured to be terminated to the end of the corresponding data communication cable or mounted to a circuit board. The circular plug connector 102 and circular mating connector 104 are mated together to create an electrical connection therebetween. Data is transmitted across the interface between the circular plug connector 102 and the circular mating connector 104.

In an exemplary embodiment, the circular plug connector 102 and circular mating connector 104 are designed for use in a rugged environment, such as an environment that is subject to extreme shock, vibration and the like. In one exemplary application, the connector system 100 is configured for use in military applications that require data capability in harsh environments. Other applications include industrial applications, aerospace applications, marine applications, and the like. The subject matter herein may have application in other moderate environments, such as in building network systems. In the illustrated environment, the circular plug connector 102 and the circular mating connector 104 constitute high performance cylindrical connectors, designed in accordance with the MIL-DTL-38999 standard. Optionally, the circular mating connector 104 may be panel mounted.

The circular mating connector 104 includes an outer housing 110 having a cavity 112 therein. In the illustrated embodiment, the outer housing 110 includes a mounting flange 113 for mounting the circular mating connector 104 to a panel or other structure. An inner housing 114 is received in the cavity 112. The inner housing 114 includes contact channels 115 holding mating contacts 116. In an exemplary embodiment, an outer surface of the outer housing 110 may include threads 118, such as forward of the mounting flange 113, for threaded mating with the circular plug connector 102.

The circular plug connector 102 includes a plug shell 120 having a cavity 122 therein. A plug insert 124 is received in the plug shell 120. In an exemplary embodiment, the plug shell 120 and the plug insert 124 are generally cylindrical. The plug insert 124 holds plug contacts 126 configured to be mated with the mating contacts 116. In an exemplary embodiment, the plug shell 120 is manufactured from a metal material and may provide electrical shielding for the plug contacts 126 and the plug insert 124. In the illustrated embodiment, the mating contacts 116 are pin contacts and the plug contacts 126 are socket contacts configured to receive the pin contacts to create an electrical connection therebetween. In other various embodiments, the mating contacts 116 are socket contacts and the plug contacts 126 are pin contacts. Other types of contacts may be used in alternative embodiments, such as fiber-optic contacts.

In an exemplary embodiment, the circular plug connector 102 includes an outer coupling ring 130 surrounding the plug shell 120. The outer coupling ring 130 is rotatably coupled to the plug shell 120. The outer coupling ring 130 includes a mating element used to secure the circular plug connector 102 to the circular mating connector 104. In an exemplary embodiment, the mating element includes internal threads 132 along an interior surface of the outer coupling ring 130. The outer coupling ring 130 is generally cylindrical. The outer coupling ring 130 may be manufactured from metal material or plastic material. In various embodiments, the outer coupling ring 130 may be a threaded coupler. In other various embodiments, the mating element 132 may be another type of mating element, such as a bayonet coupler, a breech lock coupler or another type of coupler.

When the circular plug connector 102 is coupled to the circular mating connector 104, the plug contacts 126 are mated with the mating contacts 116 to make a data communication connection therebetween. Data is transmitted across the interface between the connectors 102, 104. When the outer housing 110 and the plug shell 120 are coupled together, a robust connection is provided between the circular plug connector 102 and the circular mating connector 104. The robust connection is capable of withstanding harsh environments, such as vibration and shock. The connection between the plug shell 120 and the outer housing 110, such as via the outer coupling ring 130, withstands the forces exerted by the harsh environment, such that the interface between the connectors 102, 104 is maintained, generally without any stress at the interface. In various embodiments, the circular plug connector 102 may include a compression element, such as a grommet or gasket, between the connectors 102, 104 that allows relative movement therebetween to withstand the stresses due to vibration and shock.

Figure 2:
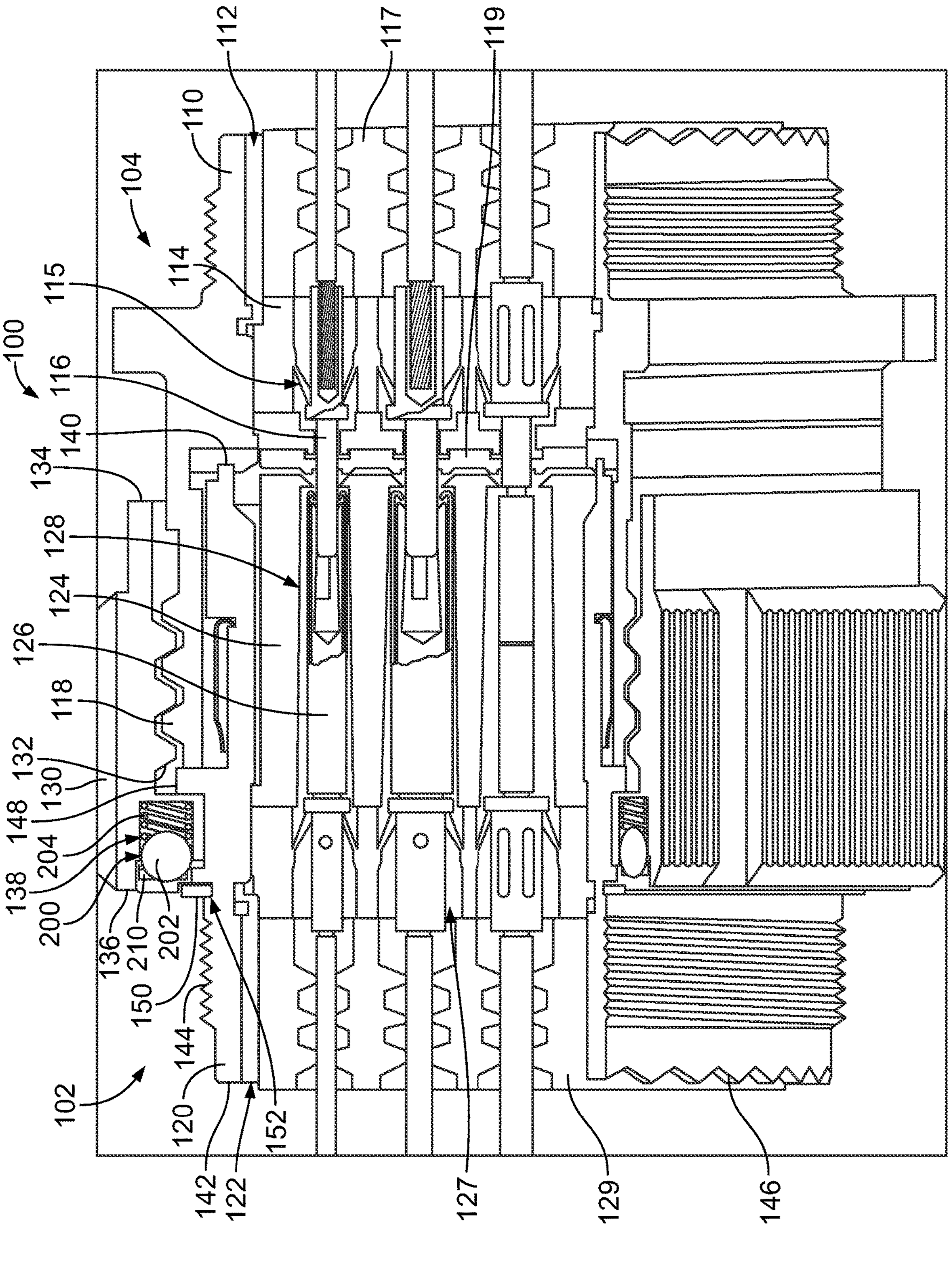
FIG. 2 is a cross-sectional view of the communication system in accordance with an exemplary embodiment showing the circular plug connector coupled to the circular mating connector.

FIG. 2 is a cross-sectional view of the connector system 100 in accordance with an exemplary embodiment showing the circular plug connector 102 coupled to the circular mating connector 104. FIG. 2 illustrates the inner housing 114 located in the cavity 112 of the outer housing 110. The mating contacts 116 are held in the contact channels 115 of the inner housing 114. The mating contacts 116 are terminated to ends of conductors of wires of the cable extending from the rear end of the circular mating connector 104. In an exemplary embodiment, a grommet 117 is provided at the rear end of the cavity 112, such as rearward of the inner housing 114. The wires pass through openings in the grommet 117. The grommet 117 is sealed to the wires to seal the rear end of the circular mating connector 104. In an exemplary embodiment, the circular mating connector 104 includes a front seal 119 forward of the inner housing 114. The circular plug connector 102 is configured to be sealed against the front seal 119 when the circular plug connector 102 is coupled to the circular mating connector 104. The mating ends of the mating contacts 116 pass through openings in the front seal 119 to interface with the plug contacts 126 of the circular plug connector 102. In the illustrated embodiment, the mating contacts 116 are pin contacts and the plug contacts 126 are socket contacts.

The circular plug connector 102 is coupled to the circular mating connector 104 using the outer coupling ring 130. The plug shell 120 is plugged into the cavity 112 and the outer coupling ring 130 is rotatably coupled to the threads 118 to secure the circular plug connector 102 to the circular mating connector 104. FIG. 2 illustrates the plug insert 124 located in the cavity 122 of the plug shell 120. The plug contacts 126 are arranged in corresponding contact channels 127 of the plug insert 124. The plug contacts 126 are terminated to ends of conductors of wires of the cable extending from the rear end of the circular plug connector 102. The plug contacts 126 may be retained in the contact channels 127 using latches 128. In an exemplary embodiment, a grommet 129 is located in the cavity 122 rearward of the plug insert 124. The wires pass through openings in the grommet 129. The grommet 129 is sealed to the wires to seal the rear end of the circular plug connector 102.

The outer coupler ring 130 extends between a front 134 and a rear 136. In an exemplary embodiment, the outer coupling ring 130 is generally cylindrical along an axial length of the outer coupling ring 130. The outer coupling ring 130 includes a pocket 138 that receives an anti-rotation mechanism 200 used to hold the position of the outer coupling ring 130 relative to the plug shell 120. The anti-rotation mechanism 200 is used to prevent inadvertent uncoupling or loosening of the outer coupling ring 130 during use. For example, the anti-rotation mechanism 200 uses friction to hold (for example, lock) the rotational position of the outer coupling ring 130 relative to the plug shell 120 under normal operating conditions. The friction force may be overcome by an operator to loosen the outer coupling ring 130 to allow uncoupling and removal of the circular plug connector 102 from the circular mating connector 104. In an exemplary embodiment, the pocket 138 is located at or near the rear 136 of the outer coupling ring 130. Other locations are possible in alternative embodiments.

The plug shell 120 extends between a front 140 and a rear 142. The plug shell 120 is generally cylindrical along an axial length of the plug shell 120. In various embodiments, the plug shell 120 is machined to form the various features along the exterior of the plug shell 120 and to form the cavity 122. In other various embodiments, the plug shell 120 is die-cast. The cavity 122 is open at the front 140 to expose the plug contacts 126 for mating with the mating contacts 116. The cavity 122 is open at the rear 142 to allow the cables to exit the plug shell 120. In an exemplary embodiment, the plug shell 120 includes threads 144 at the rear 142, such as for attachment of a cable ferrule or other connector to the rear 142 of the plug shell 120. Optionally, the plug shell 120 may include serrations 146 at the rear 142, such as for attachment to a cable jacket, a cable ferrule or other component. In an exemplary embodiment, the plug shell includes a flange 148 extending therefrom. The flange 148 includes a front facing surface configured to engage the front of the outer housing 110 to bottom out the plug shell 120 against the outer housing 110 when fully mated. The flange 148 includes a rear facing support surface configured to interface with the outer coupling ring 130. The outer coupling ring 130 may drive against the rear facing surface of the flange 148 to load the plug shell 120 into the cavity of the outer housing 110 to mate the circular plug connector 102 with the circular mating connector 104.

In an exemplary embodiment, a retainer 150 is used to retain the outer coupler ring 130 on the plug shell 120. For example, the retainer 150 may be a snap ring coupled to the plug shell 120 and located rearward of the outer coupling ring 130 to retain the outer coupling ring 130 on the plug shell 120. The retainer 150 is received in a groove 152 formed in the exterior surface of the plug shell 120. The outer coupling ring 130 is captured between the retainer 150 and the flange 148. In an exemplary embodiment, the retainer 150 is used to retain the anti-rotation mechanism 200 in the pocket 138. For example, the pocket 138 is open at the rear 136 of the outer coupling ring 130. The retainer 150 holds the anti-rotation mechanism 200 in the pocket 138.

In an exemplary embodiment, the anti-rotation mechanism includes a locking ball 202, a biasing member 204 interfacing with the locking ball 202, and a clicker disc 210 interfacing with the locking ball 202 to hold positions at defined angular positions. The locking ball 202 is biased by the biasing member 204 toward the clicker disc 210. In an exemplary embodiment, a plurality of the locking balls 202 and biasing members 204 may be provided at different locations around the outer coupling ring 130.

The clicker disc 210 includes a plurality of dimples 212 (shown in FIGS. 3 and 4) circumferentially spaced apart along a ring plate 214 that surrounds the plug shell 120. The outer coupling ring 130 moves the locking ball 202 relative to the clicker disc 210 as the outer coupler ring 130 is tightened and loosened. The locking balls 202 are moved along the clicker disc 210 along a circumferential track. The locking balls 202 are pressed into the dimples 212 and clicks or locks into place when the locking ball 202 is aligned with the dimple 212. The outer coupler ring 130 is positionable at various angular positions relative to the clicker disc 210 by the locking balls 202. For example, the outer coupler ring 130 stops at a position in which the locking ball 202 is located in the dimple 212. The outer coupling ring 130 may be rotated (for example, tightened or loosened) by aligning the locking ball 202 with a different dimple 212.

In an exemplary embodiment, the biasing member 204 is a spring, such as a coil spring. Other types of biasing members may be used in alternative embodiments. The biasing member 204 is located in the corresponding pocket 138. A first end of the biasing member 204 engages the outer coupling ring 130. A second end of the biasing member 204 engages the locking ball 202. The biasing member 204 biases the locking ball 202 away from the outer coupling ring 130 (for example, away from the first end). In the illustrated embodiment, the biasing member 204 biases the locking ball 202 in a rearward biasing direction. The biasing direction is oriented parallel to the mating axis of the plug shell 120 with the circular mating connector 104. The clicker disc 210 is located rearward of the locking ball 202 and the biasing member 204. The clicker disc 210 blocks the locking ball 202 to retain the locking ball 202 in the pocket 138. Other arrangements are possible in alternative embodiments. For example, the clicker disc 210 may be located radially inward of the locking ball 202 and the biasing member 204 may bias the locking ball 202 and a radially inward direction. In such embodiment, the biasing direction is oriented perpendicular to the mating axis of the plug shell 120 with the circular mating connector 104. In such embodiment, the clicker disc 210 may be a separate and discrete component from the plug shell 120, such as a band surrounding the exterior of the plug shell 120. However, in alternative embodiments, the clicker disc 210 may be integral with the plug shell 120. For example, the plug shell 120 may be formed to include the dimples 212, such as by drilling or otherwise remove the material of the plug shell 120 to form the dimples 212.

Figure 3:
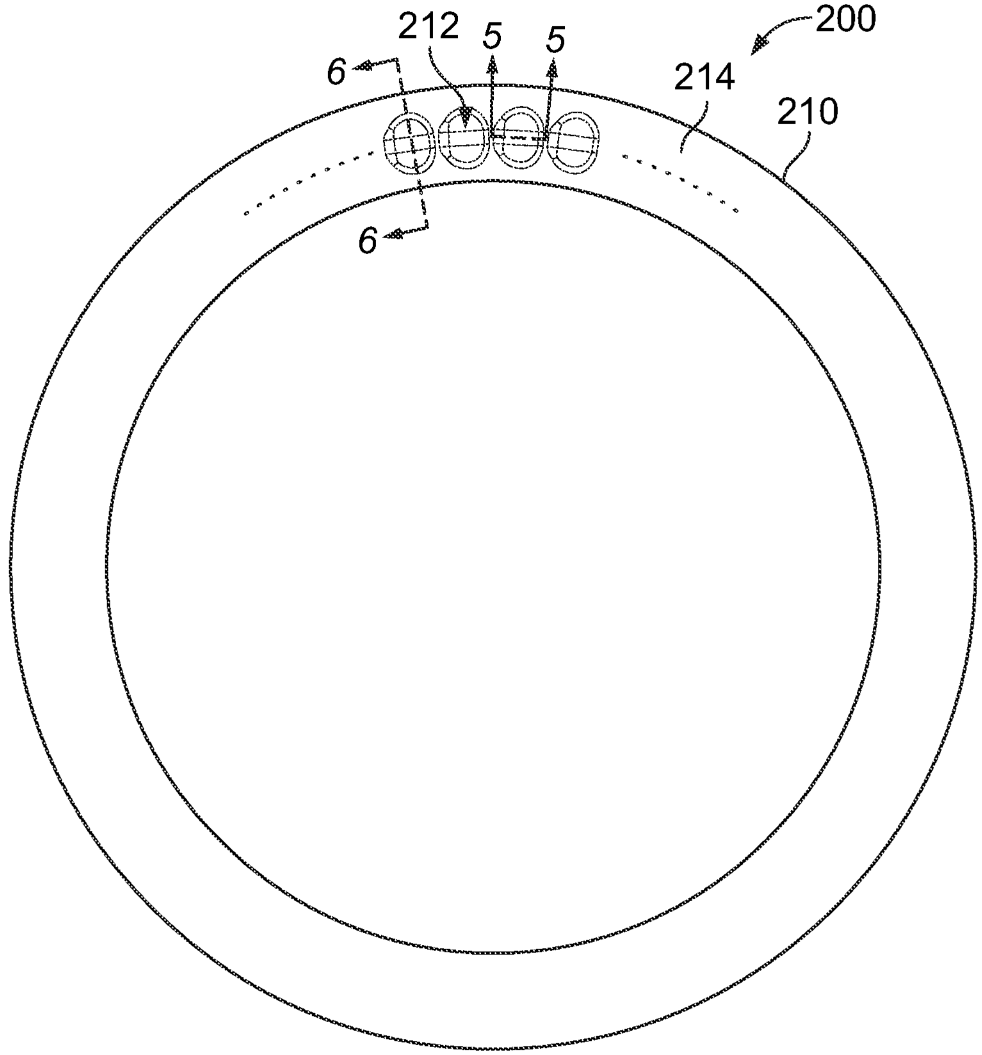
FIG. 3 is a front view of the clicker disc of the anti-rotation mechanism in accordance with an exemplary embodiment.
Figure 4:
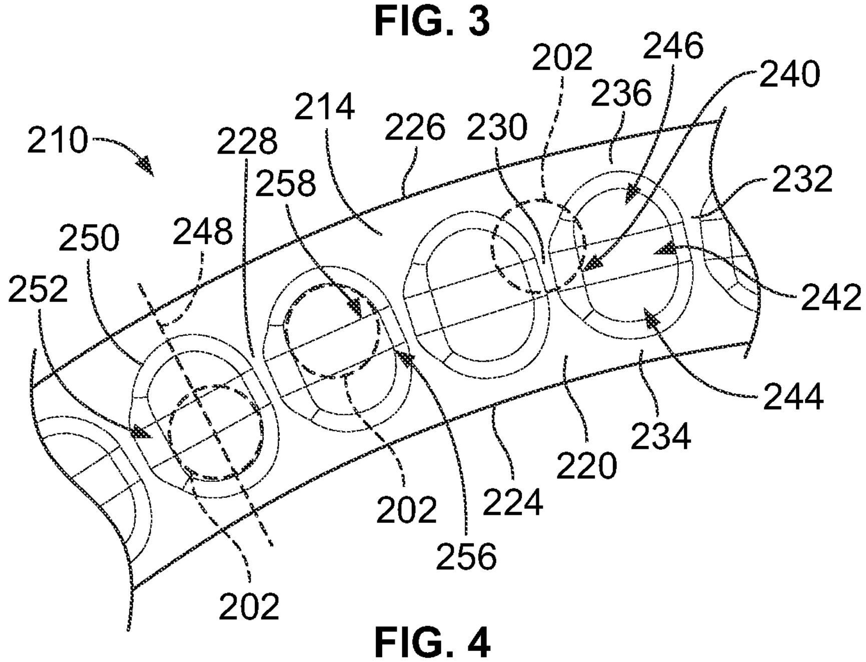
FIG. 4 is an enlarged view of a portion of the clicker disc in accordance with an exemplary embodiment.
Figure 5:
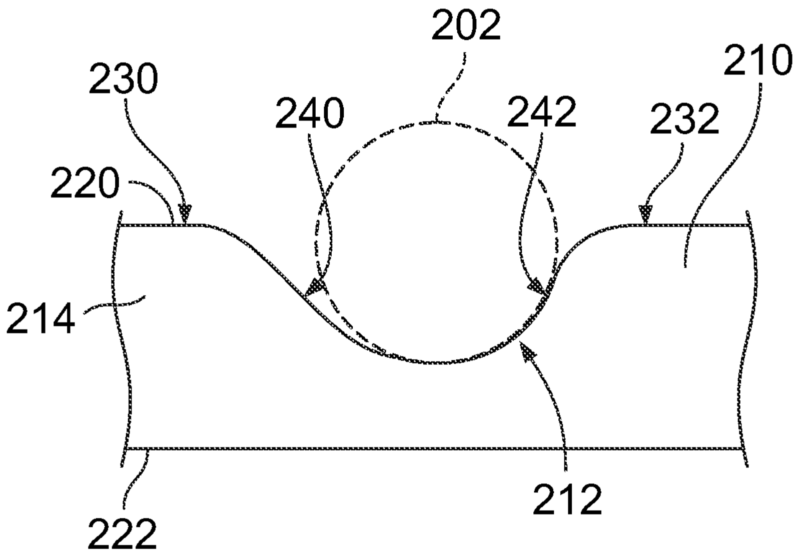
FIG. 5 is a cross-sectional view of the clicker disc in accordance with an exemplary embodiment taken along line 5-5.
Figure 6:
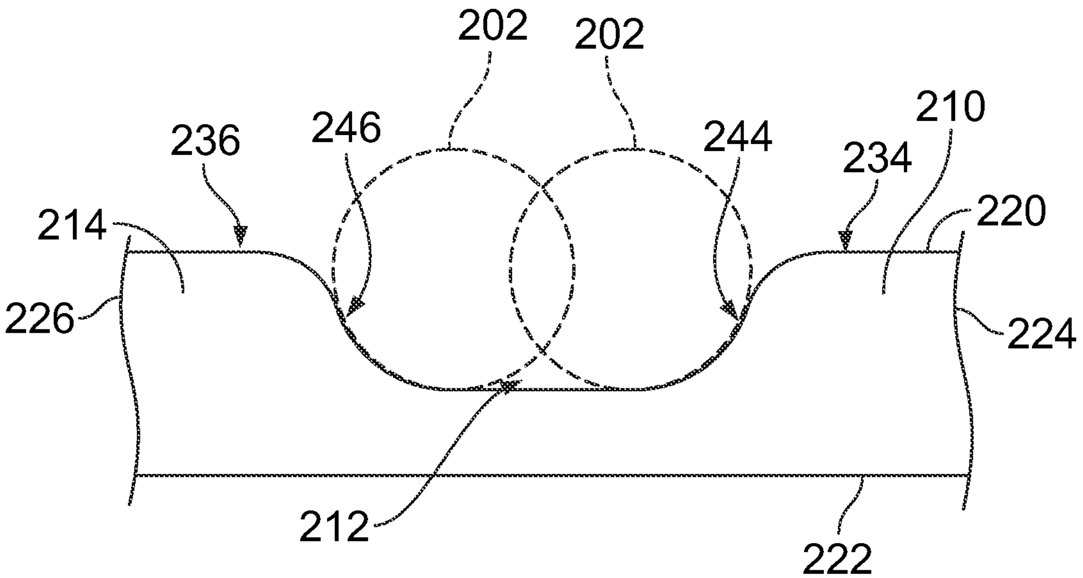
FIG. 6 is a cross-sectional view of the clicker disc in accordance with an exemplary embodiment taken along line 6-6.

FIG. 3 is a front view of the clicker disc 210 of the anti-rotation mechanism 200 in accordance with an exemplary embodiment. FIG. 4 is an enlarged view of a portion of the clicker disc 210 in accordance with an exemplary embodiment. FIG. 5 is a cross-sectional view of the clicker disc 210 in accordance with an exemplary embodiment taken along line 5-5. FIG. 6 is a cross-sectional view of the clicker disc 210 in accordance with an exemplary embodiment taken along line 6-6.

The clicker disc 210 includes the ring plate 214 and the dimples 212 circumferentially spaced apart along the ring plate 214. In an exemplary embodiment, the dimples 212 are tightly spaced around the ring plate 214 to provide many locations for the locking balls 202 and provide small angular spacing between each of the clicks.

The ring plate 214 includes a front surface 220 and a rear surface 222. The ring plate 214 includes an inner edge 224 and an outer edge 226. The ring plate 214 may be generally planar. The ring plate 214 may be arranged in the circular plug connector 102 such that the front surface 220 faces the outer coupling ring 130. The dimples 212 extend inward from the front surface 220 of the ring plate 214. The front surface 220 may be flat with the dimples 212 extending inward from the front surface 220. The rear surface 222 may be flat, such as parallel to the front surface 220. In various embodiments, the ring plate 214 may have a generally uniform thickness, such as with the rear surface 222 following the front surface 220 and the dimples 212. The ring plate 214 includes webs 228 of material between the dimples 212. The locking balls 202 are configured to ride along the webs 228 of material between the dimples 212. The dimples 212 are closely spaced such that the webs 228 are narrow leading to short angular spacing between the dimples 212. As such, the clicker disc 210 has a high number of positions (for example, clicks) for a 360° rotation of the outer coupling ring 130 relative to the clicker disc 210. In an exemplary embodiment, the widths of the webs 228 is less than the widths of the dimples 212. The front surface 220 of the ring plate 214 is configured to face the outer coupling ring 130. The front surface 220 may abut against the outer coupling ring 130. The outer coupler ring 130 rotates relative to the front surface 220.

In an exemplary embodiment, the dimples 212 are cup-shaped. The dimples 212 have curved profiles. For example, each dimple 212 has a curved surface having a radius of curvature matching a radius of curvature of the locking ball 202. In an exemplary embodiment, the dimple 212 has a width that is less than or equal to a diameter of the locking ball 202. As such, the locking ball 202 does not move or roll within the dimple 212. In an exemplary embodiment, the ring plate 214 completely surrounds each dimple 212. For example, each dimple 212 includes a first end 240 and a second end 242 opposite the first end 240. Each dimple 212 includes a first side 244 and a second side 246 opposite the first side 244. The first and second sides 244, 246 are radially offset from each other along an axis 248. The ring plate 214 includes a first end portion 230 along the first end 240, a second end portion 232 along the second end 242, a first side portion 234 along the first side 244, and a second side portion 236 along the second side 246. The first and second end portions 230, 232 are connected by the first and second side portions 234, 236. In an exemplary embodiment, each dimple 212 has a perimeter 250 at the ring plate 214. The perimeter 250 is curved. For example, the first end 240 and the second end 242 may be curved. The first side 244 and the second side 246 may be curved.

In an exemplary embodiment, each dimple 212 includes a ramp 252 at the first side 244. The ramp 252 extends form at the ring plate 214 into the dimple 212. The ramp 252 guides the locking ball 202 into or out of the dimple 212. The ramp 252 may make it easier (for example, less friction or force) for the locking ball 202 to exit the dimple 212 at the ramp 252 at the first side 244 compared to exiting at the second side 246 (for example, no ramp).

In an exemplary embodiment, the dimple 212 is oval-shaped or racetrack-shaped. The dimple 212 is elongated along the axis 248. For example, the dimple 212 is elongated in a radial direction between the first side 244 and the second side 246 of the dimple 212. The dimple 212 is configured to receive the locking ball 202 in different areas. For example, the dimple 212 may be cupped at the first side 244 to receive the locking ball 202 at the first side 244 and the dimple 212 may be cupped at the second side 246 to receive the locking ball 202 at the second side 246. The dimples 212 receive the locking balls 202 along different tracks, such as a radially inner circumferential track 256 and a radially outer circumferential track 258. The locking ball 202 may be received in the dimple 212 at the first side 244 when in the radially inner circumferential track 256. The locking ball 202 may be received in the dimple 212 at the second side 246 when in the radially outer circumferential track 258. Providing multiple tracks 256, 258 reduces wear along the ring plate 214 and the dimples 212 due to rotation of the locking balls 202 along the clicker disc 210. In various embodiments, the locking balls 202 may be arranged in offset positions relative to each other. For example, half of the locking balls 202 may be located in the dimples while the other half of the locking balls 202 may be aligned with the webs 228.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A circular plug connector comprising:

a plug shell having a mating end configured to be mated with a mating connector, the plug shell having a cavity;

a plug insert received in the cavity, plug contacts held in the plug insert, the plug contacts having mating ends configured to be mated with mating contacts of the mating connector;

an outer coupling ring rotatable about the plug shell, the outer coupling ring including threads configured to be threadably coupled to the mating connector; and an anti-rotation mechanism between the plug shell and the outer coupling ring to resist rotation of the outer coupling ring relative to the plug shell, the anti-rotation mechanism including a locking ball, a biasing member interfacing with the locking ball, and a clicker disk, the clicker disk including a ring plate surrounding the plug shell and an array of dimples circumferentially spaced apart along the ring plate, the ring plate having a front and a rear, the dimples being open at the front to receive the locking ball, the dimples having a curved profile curved inwardly from the front.

2. The circular plug connector of claim 1, wherein the dimples are cup-shaped pockets open at the front and closed at the rear.

3. The circular plug connector of claim 1, wherein the ring plate completely surrounds each dimple.

4. The circular plug connector of claim 1, wherein each dimple includes a first end, a second end, a first side, and a second side, the ring plate including a first end portion along the first end, a second end portion along the second end, a first side portion along the first side, and a second side portion along the second side, the first and second end portions being connected by the first and second side portions.

5. The circular plug connector of claim 1, wherein each dimple has a perimeter at the ring plate, the perimeter being curved.

6. The circular plug connector of claim 1, wherein the ring plate includes an outer surface, the dimples extending outward from the outer surface.

7. The circular plug connector of claim 6, wherein the outer coupling ring includes a stop surface, an inner surface of the ring plate interfacing with and sliding along the stop surface as the outer coupling ring is rotated.

8. The circular plug connector of claim 1, wherein the biasing member presses the locking ball into the dimples in a biasing direction, the biasing direction oriented parallel to a mating axis of the plug shell with the mating connector.

9. The circular plug connector of claim 1, wherein the biasing member presses the locking ball into the dimples in a biasing direction, the biasing direction oriented perpendicular to a mating axis of the plug shell with the mating connector.

10. The circular plug connector of claim 1, wherein each dimple includes a ramp at the front of the ring plate.

11. The circular plug connector of claim 1, wherein each dimple is oval-shaped being elongated in a radial direction between a first side and a second side of the dimple.

12. The circular plug connector of claim 11, wherein the clicker disk includes a radially inner circumferential track and a radially outer circumferential track, the locking ball being received in the dimple at the first side when in the radially inner circumferential track, the locking ball being received in the dimple at the second side when in the radially outer circumferential track.

13. The circular plug connector of claim 1, wherein each dimple has a curved surface recessed in the ring plate having a radius of curvature matching a radius of curvature of the locking ball.

14. A circular plug connector comprising:

a plug shell having a mating end configured to be mated with a mating connector, the plug shell having a cavity;

a plug insert received in the cavity, plug contacts held in the plug insert, the plug contacts having mating ends configured to be mated with mating contacts of the mating connector;

an outer coupling ring rotatable about the plug shell, the outer coupling ring including threads configured to be threadably coupled to the mating connector; and an anti-rotation mechanism between the plug shell and the outer coupling ring to resist rotation of the outer coupling ring relative to the plug shell, the anti-rotation mechanism including a locking ball, a biasing member interfacing with the locking ball, and a clicker disk, the clicker disk including a ring plate surrounding the plug shell and an array of dimples circumferentially spaced apart along the ring plate, the dimples being oval shaped being elongated in a radial direction between a first side and a second side of the dimple, the dimples defining a radially inner circumferential track for the locking ball at the first side of each dimple and a radially outer circumferential track for the locking ball at the second side of each dimple, the locking ball being received in the dimple at the first side when in the radially inner circumferential track, the locking ball being received in the dimple at the second side when in the radially outer circumferential track.

15. The circular plug connector of claim 14, wherein the dimples are cup-shaped.

16. The circular plug connector of claim 14, wherein the ring plate includes an inner surface, the dimples extending outward from the inner surface, the outer coupling ring including a stop surface, the inner surface interfacing with and sliding along the stop surface as the outer coupling ring is rotated.

17. The circular plug connector of claim 14, wherein each dimple has a curved surface having a radius of curvature matching a radius of curvature of the locking ball.

18. A connector system comprising:

a circular plug connector and a circular mating connector coupled together;

the circular mating connector including an outer housing having a mating end and an inner housing received in a cavity of the outer housing, the inner housing holding mating contacts, the outer housing having external threads;

the circular plug connector including a plug shell having a mating end received in the cavity of the outer housing, the plug shell having a cavity;

the circular plug connector including a plug insert received in the cavity, the circular plug connector including plug contacts held in the plug insert, the plug contacts having mating ends mated with the mating contacts of the circular mating connector;

the circular plug connector including an outer coupling ring rotatable about the plug shell, the outer coupling ring including threads configured to be threadably coupled to the external threads of the outer housing to secure the circular plug connector to the circular mating connector; and the circular plug connector including an anti-rotation mechanism between the plug shell and the outer coupling ring to resist rotation of the outer coupling ring relative to the plug shell, the anti-rotation mechanism including a locking ball, a biasing member interfacing with the locking ball, and a clicker disk, the clicker disk including a ring plate surrounding the plug shell and an array of dimples circumferentially spaced apart along the ring plate, the ring plate having a front and a rear, the dimples being open at the front and closed at the rear to form pockets that receive the locking ball.

19. The connector system of claim 18, wherein each dimple has a curved surface having a radius of curvature matching a radius of curvature of the locking ball.

20. The connector system of claim 18, wherein each dimple is oval-shaped being elongated in a radial direction between a first side and a second side of the dimple, the clicker disk including a radially inner circumferential track and a radially outer circumferential track, the locking ball being received in the dimple at the first side when in the radially inner circumferential track, the locking ball being received in the dimple at the second side when in the radially outer circumferential track.

* * * * *